United States Patent [19]

Seltzer

[11] Patent Number: 4,509,460
[45] Date of Patent: Apr. 9, 1985

[54] WATERING DEVICE FOR ANIMALS

[76] Inventor: Leonard W. Seltzer, R.R. 1, Box 160, Manhattan, Ill. 60442

[21] Appl. No.: 539,248

[22] Filed: Oct. 5, 1983

[51] Int. Cl.³ ............................................. A01K 7/02
[52] U.S. Cl. ....................................... 119/74; 119/78
[58] Field of Search ........................ 119/72, 73, 74, 75, 119/76, 78, 61; 285/158

[56] References Cited

U.S. PATENT DOCUMENTS

| | | | |
|---|---|---|---|
| 729,688 | 6/1903 | Smith et al. | 119/71 |
| 2,463,405 | 3/1949 | McMaster | 285/158 |
| 2,813,692 | 11/1957 | Bremer et al. | 285/158 |
| 3,972,547 | 8/1976 | Itoya | 285/158 |
| 4,069,409 | 1/1978 | Noland et al. | 119/73 |
| 4,248,176 | 2/1981 | Kilstofte | 119/72 |

Primary Examiner—Hugh R. Chamblee

[57] ABSTRACT

A watering device for domestic animals of different heights, having a first water supply means for animals of relatively low height such as hogs and a second water supply means for animals of relatively greater height such as cattle, both in the same housing. The first water supply means for hogs includes a watering nipple mounted in a bracket which in turn is mounted in the side wall of the housing. The second water supply means for cattle includes a watering trough or pan mounted in the top wall of the housing. Both first and second water supply means are fed by conduits leading to the same water intake of the housing which is connected to a water supply source.

13 Claims, 8 Drawing Figures

WATERING DEVICE FOR ANIMALS

BACKGROUND OF THE INVENTION

This invention relates to the field of watering devices for domestic animals whereby a source of drinking water is always available in the pens, or barns or pastures where such animals are kept.

It is common to keep domestic animals such as cattle and hogs in the same pastures or pens. It has been the practice prior to this invention to have separate watering devices for relatively taller animals such as cattle and for the relatively shorter animals such as hogs. This requires duplicate equipment, duplicate water lines, duplicate cabinets or other housings for the watering equipment, all of which results in duplicate expense, duplicate repairs, duplicate cleaning, duplicate protective measures against freezing and the like. Such problems are solved by the present invention which provides a watering device for shorter animals such as hogs in the same housing as a watering device for taller animals such as cattle.

Examples of prior art watering devices for animals include a hog watering nipple mounted on a stanchion as shown in U.S. Pat. No. 4,348,989, a hog watering system comprising connected watering nipples in a water line mounted along a fence as shown in U.S. Pat. No. 4,257,354; a hog watering system combined with a tank for mixing a medication with the water as shown in U.S. Pat. No. 4,248,176; a water tank having hog watering nipples on both sides as shown in U.S. Pat. No. 4,188,914; and a hog watering nipple whose height can be adjusted up and down as shown in U.S. Pat. No. 4,173,948.

SUMMARY OF THE INVENTION

It is an object of the invention to provide a watering device for domestic animals of differing heights, having a single housing, a first watering unit mounted in the housing at a lower level for animals of relatively low height such as hogs, and a second watering unit mounted in the housing at a higher level for animals of relatively taller height such as cattle.

It is an object of the invention to provide a watering device for domestic animals of differing height, including a housing having a top wall and peripheral side walls, a watering trough in the top wall for relatively tall animals such as cattle, a bracket mounted along the side wall of said housing, said bracket including a flat base portion, a tubular member projecting outwardly from the outward facing side of said flat base of said bracket, said tubular member also projecting a short distance inwardly of said housing from said inward facing side of said flat base, said inwardly facing projecting portion of said bracket being seated in a hole through the side wall of said housing, said bracket being bolted to said side wall, a hog watering nipple being mounted in the outer end of said outwardly projecting tubular member of said bracket, said inwardly projecting portion of said tubular member being connected to a water supply line within said housing, said watering trough for cattle being connected to said same water supply line.

It is an object of the invention to provide a watering device for domestic animals of differing heights, having a single housing, a first watering unit mounted in the housing at a relatively greater height such as cattle, a second watering unit mounted in the same housing at a lower level for animals of relatively lower height such as grown hogs, and a third watering unit also mounted in said housing at a still lower level for animals of even lower height such as baby pigs, all of said watering units being connected to the same water supply source within said housing.

DESCRIPTION OF PREFERRED EMBODIMENT

Figure 1:
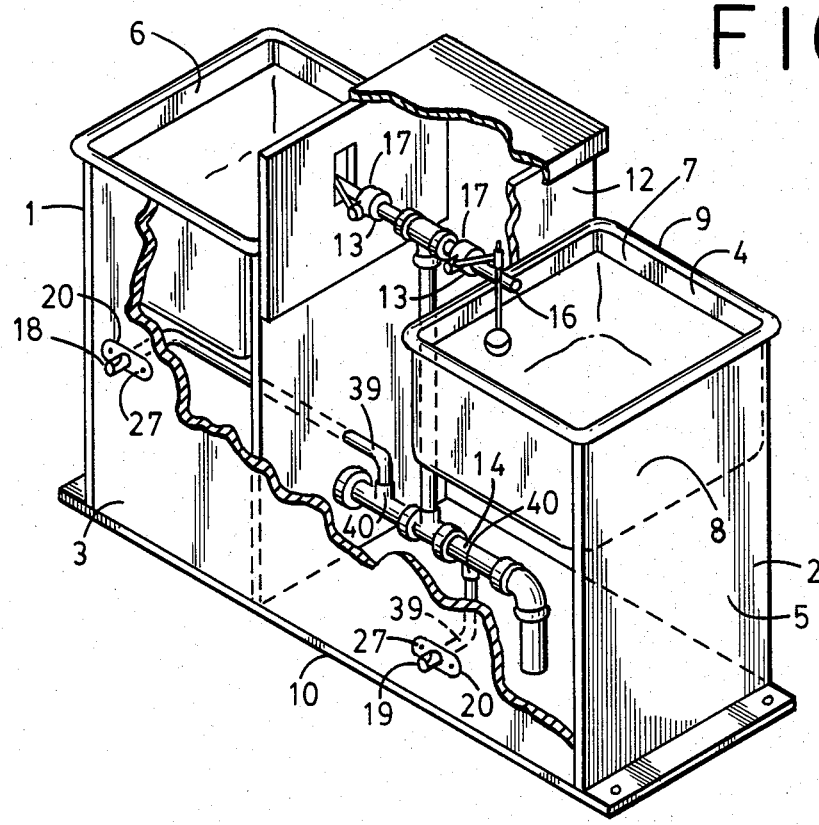
FIG. 1 is a perspective view of watering device for animals in accordance with this invention, with one side wall of the housing partially broken away and parts internally thereof shown in phantom by broken lines.
Figure 2:
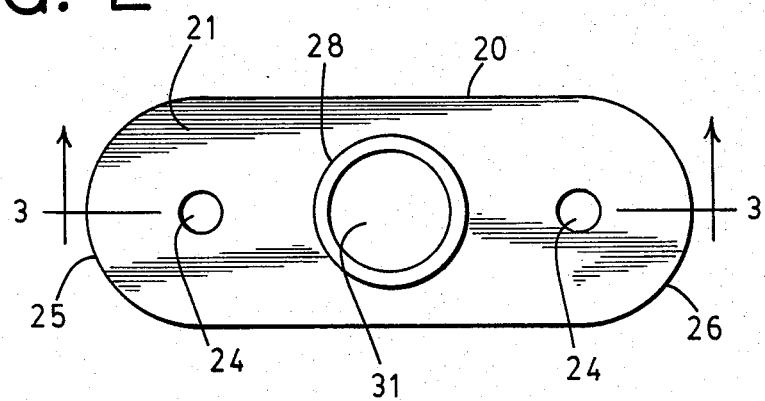
FIG. 2 is a plan view of a mounting bracket in accordance with this invention to mount a watering device for lower height animals to the side wall of a housing which includes a watering device for greater height animals located at a higher level therein.
Figure 3:
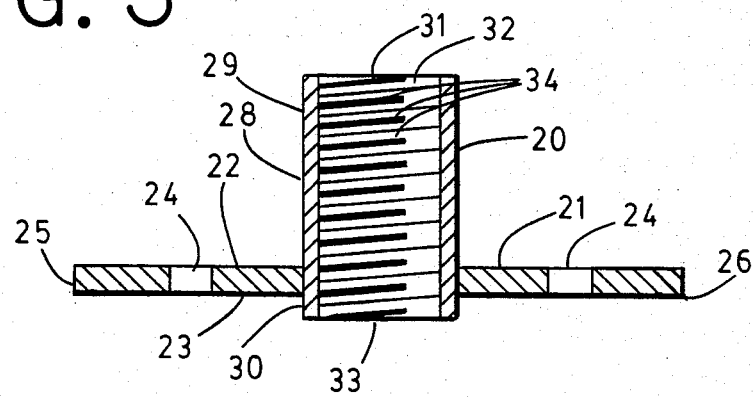
FIG. 3 is a section view taken on line 3—3 of FIG. 2.
Figure 5:
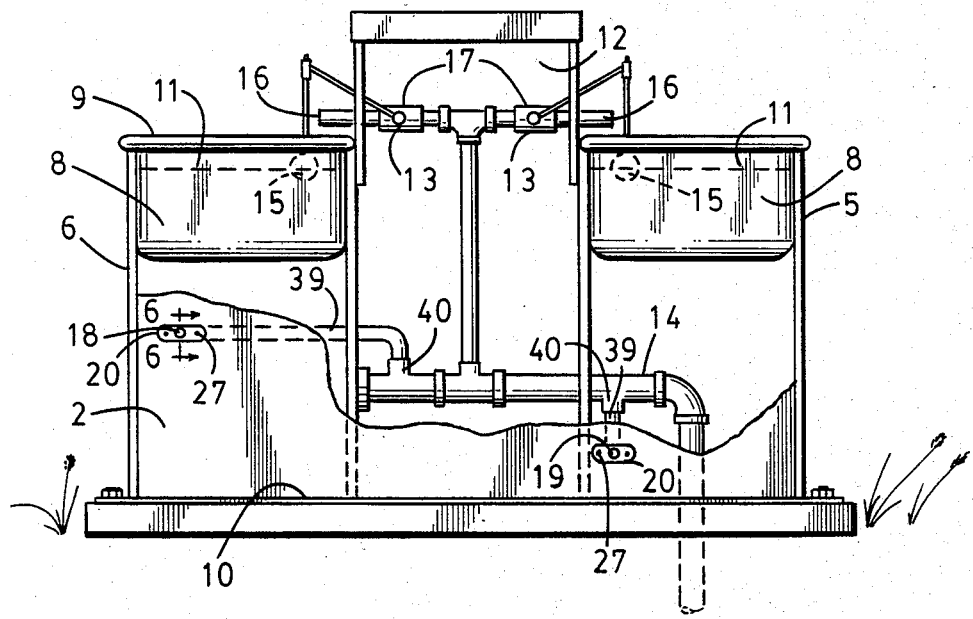
FIG. 5 is a side elevation view of a watering device in accordance with this invention with a side wall of the housing partially broken away and parts internally thereof shown in phantom by broken lines.
Figure 4:
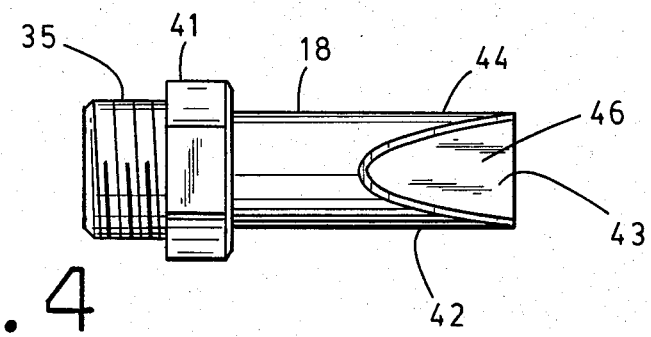
FIG. 4 is an elevation view of a watering nipple for hogs for use in accordance with this invention.
Figure 6:
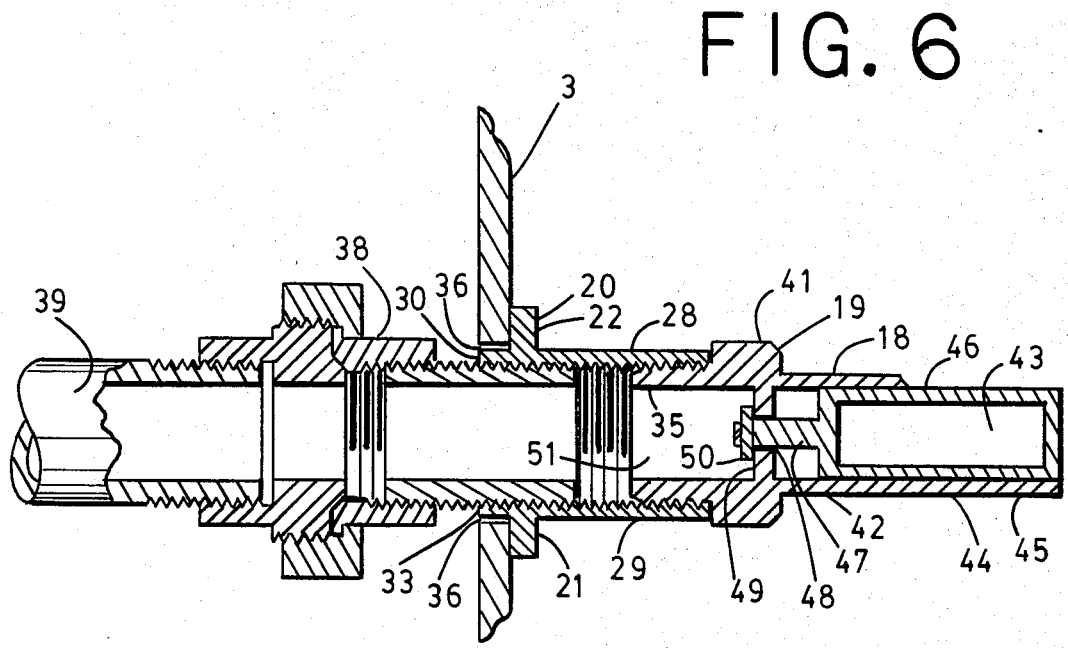
FIG. 6 is a section view taken on line 6—6 of FIG. 5.

A watering device 1 for domestic animals of different heights in accordance with this invention includes a housing 2 of generally rectangular configuration, having a pair of spaced apart side walls 3 and 4 connected at each opposite end by corresponding end walls 5 and 6. The top wall 7 of the housing 2 is open, having a pair of troughs or pans 8 mounted therein for animals of relatively greater height such as cattle to drink from.

The upper peripheral edge 9 bordering the top wall 7 of housing 2 is approximately 24 inches to about 28 inches above the bottom peripheral edge 10. The actual height of the upper peripheral edge 9 which also borders the upper rims 11 of the pans or troughs 8 may be at whatever height is convenient for the animals of relatively greater height which will be using the waterer to drink from.

A central compartment 12 is mounted between the pair of troughs or pans 8, and it projects upwardly above the upper peripheral edge 9 of the housing 2. The central compartment 12 encloses a pair of control valves 13 connected in the intake water line 14 for controlling water flow into respective ones of the pans or troughs 8, to open when water therein drops below a preselected level and to close when water therein rises to fill the pans or troughs to the desired level. Each valve 13 includes a float 15 which opens the valve when water in the trough drops below the preselected level and closes the valve when the water reaches the desired fill level. An outlet port 16 extends from the upper portion 17 of each valve 13 and opens above a corresponding pan or trough 8 through which water flows from the water line 14 when the valve 13 is open, emptying into such corresponding pan or trough 8.

Watering outlets or nipples 18 and 19 are also provided in the watering device 1 in accordance with this invention for animals of relatively lower height such as hogs. Watering nipple 18 is mounted in side wall 3 of the housing 2 at a height above that of watering nipple 19 which is also mounted in said side wall 3. Thus, watering nipple 18 is provided for animals of slightly greater height such as adult hogs, and watering nipple 19 is provided for animals of lowest height such as baby pigs. The height of watering nipple 18 above the bottom peripheral edge 10 of the housing 2 may be about six to eight inches, and that of watering nipple 19 may be about three to five inches.

Each watering nipple 18 and 19 is mounted to the side wall 3 by a mounting bracket 20. The mounting bracket 20 in accordance with this invention includes a flat base 21 having an outwardly facing side 22 when mounted in side wall 3 and an inwardly facing side 23. A pair of mounting apertures 24 are provided in each opposite end region 25 and 26 of the base 21 through which bolts 27 extend to bolt the base 21 to the side wall 3 of the housing 2.

A cylindrical projection 28 extends from the base 21 of mounting bracket 20 at substantially a right angle thereto. The cylindrical projection 28 includes a relatively longer portion 29 which extends outwardly from the outwardly facing side 22, and a relatively shorter portion 30 which extends inwardly of the housing 2 from the inwardly facing side 23 of the base 21 of bracket 20. The cylindrical projection 28 includes a central bore 31 completely through from the outer end 32 to the inner end 33 of the cylindrical projection 28, internal threads 34 being formed on the inner wall bounding the central bore 31 and extending continuously from the outer end 32 to the inner end 33.

Each watering nipple 18 and 19 includes a threaded end portion 35 which can be mated with the internally threaded bore 31 of the relatively longer portion 29 of the cylindrical projection 28 which extends outwardly of the mounting bracket 20 to mount the watering nipples 18 and 19 to the side wall 3 of the housing 2.

The relatively shorter portion 30 of the cylindrical projection 28 which extends inwardly of the mounting bracket 20 seats in the corresponding aperture 36 through the side wall 3 of the housing 2, having a cross-sectional dimension and configuration corresponding closely to that of the portion 30 of cylindrical projection 28. The mounting bracket 20 is thereby held securely against lateral movement when so mounted in the side wall 3 of the housing 2.

A tubular coupling member 38 is threadedly coupled to the inner end 33 of the bore 31 of cylindrical projection 28, inside of the side wall 3 of the housing 2. The other end of coupling member 38 is threadedly coupled to a tubular conduit 39 which extends to and is connected to the incoming water line 14 by a tap 40 opening thereto. Thus, incoming water under pressure is always available in tubular conduit 39 at the cylindrical projection 28 of mounting bracket 20 and the watering nipples 18 and 19 mounted therein.

The watering nipples 18 and 19 are of identical construction so only one will be described. Outwardly from the threaded end 35 of the watering nipple is a wrench grasping annular hexagonal ring portion 41, and outwardly from that is a watering end assembly 42.

The watering end assembly 42 includes a slidable cylindrical piston member 43 slidingly mounted in a cut-away slide 44 of corresponding peripheral configuration, having a full peripheral wall 45 around the downward facing portion of the piston member 43 and a cut-away portion 46 facing upwardly from the upward facing portion of the piston member 43. The piston 43 includes a short piston rod 47 at its inwardly facing end, projecting through a corresponding opening 48 in a retaining wall 49 to a circular closure member or washer 50 of flexible resilient material such as rubber, felt, leather, plastic or the like capable of sealing the opening 48 against passage of water therethrough when the closure member 50 is pressed against the retaining wall 49 by the pressure of the water in tubular conduit 39 and central bore 21 of mounting bracket 20 in communication with the tubular chamber 51 of the watering nipple 18 or 19 rearward of the retaining wall 49 and bounded by the peripheral wall portion of threaded end 35 and hexagonal ring portion 41.

As long as nothing is touching the slidable cylindrical piston member 43, the water pressure in tubular conduit 39, central bore 21 of mounting bracket 21, and tubular chamber 51 bearing against the surface of closure member or sealing washer 50 forces it against the retaining wall 49 thereby preventing water from flowing through opening 48 into the cut-away slide 44 of the watering nipple 18 or 19. When an animal such as a hog places its mouth over the watering nipple and touches the slidable piston member 43, the piston member 43 is moved axially rearwardly moving piston rod 47 and sealing washer 50 rearwardly and away from sealing relationship with opening 48. Water thereupon is able to flow through opening 48 into the slide 44 and around the cut-away portion 46, and thus into the mouth of the animal whose mouth is placed over the watering nipple. When the animal takes his mouth away from the nipple and piston 43, the water pressure in tubular conduit 39 presses against the surface of sealing washer 50 forcing it against the retaining wall 49 and thereby closing the opening 48 against further passage of water.

Figure 7:
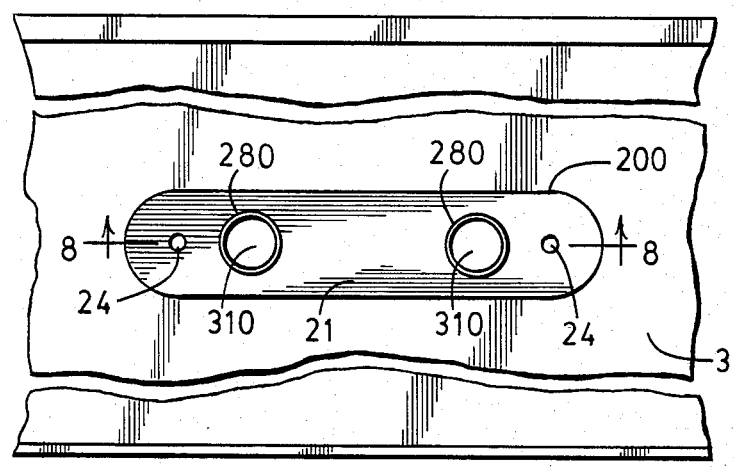
FIG. 7 is a plan view of a modified mounting bracket in accordance with this invention having two coupling sleeves therein for connection of two watering nipples to the same mounting bracket, showing a fragment of the wall of the housing in which it is mounted.
Figure 8:
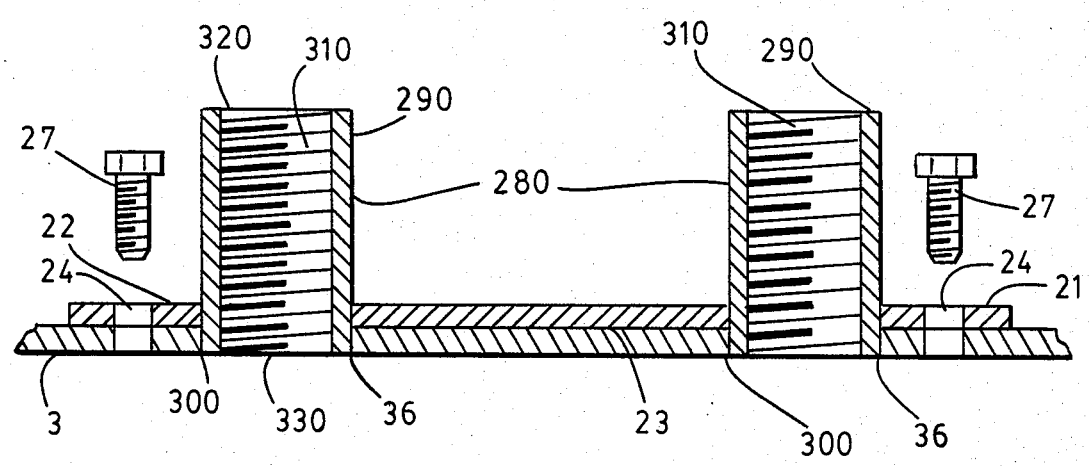
FIG. 8 is a section view taken on line 8—8 of FIG. 7.

FIGS. 7 and 8 illustrate a modified form of the mounting bracket 200 in accordance with this invention, having a plurality (in this case two) of cylindrical projections 280 extending from the base 21 in laterally spaced apart relationship. The cylindrical projections 280 include respective relatively longer portions 290 which extend outwardly from the outwardly facing side 22 of the base 21, and respective relatively shorter portions 300 which extend inwardly of the housing 2 from the inwardly facing side 23 of the base 21 of bracket 200.

Each cylindrical projections 280 includes a central bore 310 completely through from the outer end 320 to the inner end 330 of the cylindrical projections 280. Internal threads 34 are formed on the inner wall bordering the central bore 310 and extending continuously from the outer end 320 to the inner end 330.

A pair of apertures 36 are provided through the side wall 3 of the housing 2, having cross-sectionsl dimensions and configurations corresponding closely to the dimensions and configurations of the portions 300 of cylindrical projections 280 which seat therein such apertures 36 being spaced apart in side wall 3 of housing 2 the same distance as the cylindrical projections 280 are spaced apart. They are spaced apart a sufficient distance to enable two animals in the swine family, such as two adult hogs, to both drink from respective watering nipples 18 connected to respective ones of the cylindrical projections 280 of the same mounting bracket 200. Such distance apart may be from twelve inches to eighteen inches. The inwardly facing portions 300 of the cylindrical projections 280 are both connected to the water conduit 39 leading to the incoming water line 14 in the same menner as illustrated and described hereinabove for the corresponding parts of the single coupling sleeve or projection bracket 20.

I claim:

1. A watering device for animals, comprising a housing having a peripheral side wall, first drinking means in said housing located therein at a first preselected height for animals of a relatively greater height to drink from, said first drinking means including a pan having an open top wall seated in said housing to receive water therein for drinking by said animals of said relatively greater height, second drinking means in said housing located therein at a second preselected height for animals of a relatively shorter height to drink from, said first preselected height being higher than said second preselected height, said housing including therein water intake means, said first and second drinking means both being positioned to receive water from the same said water intake means, bracket means to mount said drinking means in said peripheral side wall of said housing, at least one aperture in said side wall, said bracket means including inwardly facing tubular projection means having a peripheral configuration and dimension corresponding to that of said aperture to seat snugly in said aperture when said bracket means is positioned against said peripheral side wall and affixed thereto, said bracket means including outwardly facing projection means, said inwardly facing and outwardly facing projection means each having a central bore therethrough, each of said central bores being in registration to provide a through passageway through said bracket means and said peripheral side wall, water dispensing means connected to said outwardly facing tubular projection means, said water dispensing means including a portion thereof receivable in the mouth of said animals of a relatively shorter height, first water conduit means connecting said inwardly facing tubular projecting means to said water intake means and second water conduit means connected to said water intake means having an outlet positioned to pour water into said pan of said first drinking means.

2. A watering device for animals as set forth in claim 1, wherein said second drinking means includes a plurality of water dispensing means.

3. A watering device for animals as set forth in claim 2, wherein said bracket means includes a plurality of brackets corresponding in number to said plurality of water dispensing means, said peripheral side wall includes a plurality of said apertures corresponding in number to said plurality of brackets.

4. A watering device for animals as set forth in claim 3, wherein said outwardly facing tubular projection means of said brackets comprises a first cylindrical sleeve, said inwardly facing tubular projection means of said brackets comprises a second cylindrical sleeve, said first cylindrical sleeve being relatively longer in dimension than said second cylindrical sleeve, said first cylindrical sleeve including an outwardly extending free end opening to said central bore thereof for connection of a respective one of said water dispensing means thereto, said second cylindrical sleeve including an inwardly extending free end opening to said central bore thereof for connection to said water conduit means leading to said water intake means.

5. A watering device for animals as set forth in claim 4, wherein said plurality of water dispensing means includes a first water dispensing member and a second water dispensing member, each of said first and second water dispensing members being connected to respective ones of said brackets at the said outwardly facing free end of said first cylindrical sleeve thereof, said first water dispensing member and said bracket to which it is connected being mounted at a higher location on said peripheral side wall than said second water dispensing member and said bracket to which it is connected, said water dispensing members being adapted for use to provide drinking water to animals in the swine family, said first water dispensing member being located at a height convenient for substantially full grown hogs, said second water dispensing member being located at a height convenient for baby pigs.

6. A watering device for animals as set forth in claim 5, wherein said water dispensing members for animals in the swine family include a hollow cylindrical body having an outwardly extending portion to dispense drinking water and an inwardly extending portion for connection to said first cylindrical sleeve of said bracket, a water retaining wall separating said outwardly and inwardly extending portions, a central aperture through said wall, said outwardly extending portion including an elongated slide terminating at the outer end of said outwardly extending portion, a valve closure member positioned on the inwardly extending side of said water retaining wall for movement between a valve closed position against said wall and a valve open position away from said wall, a piston rod extending through said central aperture connected at its inward end to said valve closure member, an elongated cylindrical piston connected to the other end of said piston rod and being slidingly mounted on said elongated slide of said outwardly extending portion for short reciprocal movement between said valve open position whereupon water flows through said central aperture outwardly and around said elongated cylindrical piston for drinking by a one of said animals having its mouth around said cylindrical piston and said outwardly extending body portion of said water dispensing member which moves said cylindrical piston inwardly and said valve closed position whereupon said valve closure member is forced against said water retaining wall by the pressure of water from said water intake means.

7. A watering device for animals as set forth in claim 1, wherein said second drinking means includes a single water dispensing means.

8. A watering device for animals as set forth in claim 7, wherein said bracket means includes a single bracket and said peripheral side wall of said housing includes a single one of said apertures.

9. A watering device for animals as set forth in claim 8, wherein said outwardly facing tubular projection means of said single bracket comprises a first cylindrical sleeve, said inwardly facing tubular projection means of said single bracket comprises a second cylindrical sleeve, said first cylindrical sleeve including an outwardly extending free end opening to said central bore thereof for connection of said single water dispensing means thereto, said second cylindrical sleeve including an inwardly extending free end opening to said central bore thereof for connection to said water conduit means leading to said water intake means.

10. A watering device for animals as set forth in claim 9, wherein said water dispensing means includes a water dispensing member adapted for use to provide drinking water to animals in the swine family.

11. A watering device for animals as set forth in claim 1, wherein said bracket means includes a bracket member having a base, said inwardly facing tubular projection means includes a first inwardly facing tubular projection member extending inwardly from said base and a second inwardly facing tubular projection member extending inwardly from said base spaced apart from said first inwardly facing tubular projection member a pre-selected spaced apart distance, said outwardly facing tubular projection means includes a first outwardly facing tubular projection member extending outwardly from said base and a second outwardly facing tubular projection member extending outwardly from said base spaced apart from said first outwardly facing tubular projection member said same pre-selected spaced apart distance, said central bores of said first inwardly and outwardly facing tubular projection members being in registration to provide a first through passageway through said base of said bracket, said central bores of said second inwardly and outwardly facing tubular projection members being in registration to provide a second through passageway through said base of said bracket, a second aperture in said side wall of said housing spaced apart from said at least one aperture the same preselected spaced apart distance as for said tubular projecting members, said first and second inwardly facing tubular projecting members being seated in respective ones of said apertures when said bracket is affixed to said side wall of said housing.

12. A watering device for animals as set forth in claim 11, wherein said pre-selected spaced apart distance is selected to enable two animals in the swine family to stand side by side and drink from drinking means connected in each of said first and second outwardly facing tubular projection members.

13. A watering device for animals as set forth in claim 11, wherein said pre-selected spaced apart distance is any distance within a range of from twelve inches to eighteen inches.

* * * * *